(12) United States Patent
Rocquet et al.

(10) Patent No.: US 12,233,985 B2
(45) Date of Patent: *Feb. 25, 2025

(54) WHEEL MODULE FOR A VEHICLE, VEHICLE COMPRISING THE WHEEL MODULE, AND METHOD FOR BRAKING A ROTATING WHEEL OF A WHEEL MODULE

(71) Applicant: Schaeffler Technologies AG & Co. KG, Herzogenaurach (DE)

(72) Inventors: Stephane Rocquet, Sandillon (FR); Alexis Galant, Saran (FR); Julien Durr, Fleury les aubrais (FR); Simon Ortmann, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 489 days.

This patent is subject to a terminal disclaimer.

(21) Appl. No.: 17/617,613

(22) PCT Filed: May 14, 2020

(86) PCT No.: PCT/DE2020/100417
§ 371 (c)(1),
(2) Date: Dec. 9, 2021

(87) PCT Pub. No.: WO2020/253903
PCT Pub. Date: Dec. 24, 2020

(65) Prior Publication Data
US 2022/0227451 A1   Jul. 21, 2022

(30) Foreign Application Priority Data

Jun. 18, 2019  (DE) .................... 10 2019 116 425.7

(51) Int. Cl.
*B62L 3/02* (2006.01)
*B62K 3/00* (2006.01)
(Continued)

(52) U.S. Cl.
CPC .............. *B62L 3/023* (2013.01); *B62K 3/002* (2013.01); *F16D 55/02* (2013.01); *F16D 65/186* (2013.01);
(Continued)

(58) Field of Classification Search
CPC ........ B62L 3/023; F16D 55/02; F16D 65/186; F16D 65/847; F16D 2121/04; F16D 2127/02; B60T 1/065
See application file for complete search history.

(56) References Cited

U.S. PATENT DOCUMENTS 2,925,891 A   2/1960  Sanford
3,971,457 A * 7/1976  Campagnolo .......... F16D 65/54
                                                          188/26
(Continued)

FOREIGN PATENT DOCUMENTS

AU          617815 B2   12/1991
CN       101311021 A    11/2008
(Continued)

OTHER PUBLICATIONS

Autor: Xuewen Z., Title: "Analysis of Automobile Disc Brake Design", Source: Times Agricultural Machinery, 1967, 6 Pages.

*Primary Examiner* — S. Joseph Morano
*Assistant Examiner* — Emily G. Castonguay

(57) ABSTRACT

A wheel module for a vehicle, in particular for an electric motorcycle or electric scooter, includes a wheel axle and a wheel. The wheel having a wheel rim and said wheel rim being rotatably mounted on the wheel axle; and including a brake device for the wheel. The brake device having a brake pad and a brake disc for co-operating with the brake pad, said brake disc being axially movable in order to brake the wheel.

12 Claims, 3 Drawing Sheets

(51) Int. Cl.
*F16D 55/02* (2006.01)
*F16D 65/18* (2006.01)
*F16D 65/847* (2006.01)
*F16D 121/04* (2012.01)
*F16D 127/02* (2012.01)

(52) U.S. Cl.
CPC ........ *F16D 65/847* (2013.01); *F16D 2121/04* (2013.01); *F16D 2127/02* (2013.01)

(56) References Cited

U.S. PATENT DOCUMENTS

| | | | | |
|---|---|---|---|---|
| 4,139,081 | A * | 2/1979 | Klaue | F16D 65/54 |
| | | | | 188/264 AA |
| 6,247,560 | B1 | 6/2001 | Bunker | |
| 6,349,800 | B1 * | 2/2002 | Nakamura | F16D 55/40 |
| | | | | 188/26 |
| 11,945,543 | B2 * | 4/2024 | Ortmann | F16D 55/32 |
| 2002/0038742 | A1 | 4/2002 | Bunker | |
| 2002/0043777 | A1 * | 4/2002 | Ireton | A63C 17/1427 |
| | | | | 280/87.041 |
| 2004/0050631 | A1 | 3/2004 | Booher | |
| 2010/0263969 | A1 | 10/2010 | Bayer et al. | |
| 2022/0258830 | A1 * | 8/2022 | Wimmer | F16D 65/095 |

FOREIGN PATENT DOCUMENTS

| | | |
|---|---|---|
| CN | 202987412 U | 6/2013 |
| CN | 104024015 A | 9/2014 |
| CN | 104773140 A | 7/2015 |
| DE | 3632961 A1 | 3/1988 |
| DE | 20016878 U1 | 4/2001 |
| EP | 0016876 A1 | 10/1980 |
| EP | 1701056 A1 | 9/2006 |
| GB | 2052653 A | 1/1981 |
| WO | 0066908 A1 | 11/2000 |
| WO | 2014170728 A1 | 10/2014 |

* cited by examiner

WHEEL MODULE FOR A VEHICLE, VEHICLE COMPRISING THE WHEEL MODULE, AND METHOD FOR BRAKING A ROTATING WHEEL OF A WHEEL MODULE

CROSS-REFERENCE TO RELATED APPLICATIONS

This application is the U.S. National Phase of PCT Appln. No. PCT/DE2020/100417 filed May 14, 2020, which claims priority to DE 102019116425.7 filed Jun. 18, 2019, the entire disclosures of which are incorporated by reference herein.

TECHNICAL FIELD

The disclosure relates to a wheel module for a vehicle, in particular for an electric motorcycle or electric scooter. The wheel module comprises a wheel axle and a wheel with a wheel rim, said wheel rim being rotatably mounted on the wheel axle. The wheel module comprises a brake device having a brake pad and a brake disc for co-operating with the brake pad. The disclosure also relates to a vehicle having the wheel module and a method of braking a rotating wheel of a wheel module.

BACKGROUND

Two-wheeled vehicles such as pedal scooters or bicycles often use disc brakes to brake the vehicle safely.

For example, publication DE 200 16 878 U1 describes a pedal scooter with a brake device in the form of a hydraulically activated disc brake. The brake device comprises a brake caliper that is attached to the vehicle frame, grips the brake disc and is pressed against the brake disc when actuated.

SUMMARY

The disclosure is based on the object of providing a brake device that saves installation space and is adapted to a wheel size of a wheel module. This object is achieved by a wheel module for a vehicle with the features described herein, by a vehicle with the wheel module as described herein and by a method for braking a rotating wheel of a wheel module with a brake device of the wheel module with the features described herein. Preferred or advantageous embodiments of the disclosure are described in the following description and/or the attached figures.

A wheel module for a vehicle is proposed. Preferably, the vehicle has one or more wheel modules.

Preferably, the vehicle is designed as a small or micro vehicle or as an electric vehicle. Preferably, the vehicle has at least one wheel module and/or wheel. With only one wheel module and/or wheel, the vehicle can be configured as an electric unicycle, e.g., as a so-called monowheel or solowheel. With two or more wheel modules and/or wheels, the vehicle is preferably designed as a scooter, in particular as an electric motorcycle, as an electric motor scooter, as an electric pedal scooter, electric scooter, e. g., e-scooter, as a Segway, hoverboard, kickboard, skateboard, longboard or the like. Alternatively, the vehicle can be designed as a bicycle, in particular as an electric bicycle, for example as a pedelec or as an e-bike. The vehicle can alternatively be designed as a multi-track bicycle, in particular with three or more wheels. For example, the vehicle may be a transport or cargo bike, in particular a motorized or electrically powered transport or cargo bike, more specifically a three-wheeled or four-wheeled pedelec or a rickshaw, in particular with or without a roof, or a cabin scooter.

The wheel module has a wheel axle and a wheel. It is particularly preferred that the wheel forms a front wheel of the vehicle. The wheel comprises a wheel rim and preferably a tire, the tire being disposed on the wheel rim. The wheel rim is rotatably mounted on the wheel axle. Preferably, at least one rolling bearing device, preferably two rolling bearing devices, is/are provided for this purpose. A drive device, in particular an electric motor, can be integrated in the wheel to drive the wheel.

The wheel module comprises a brake device for the wheel. The brake device has a brake pad and a brake disc for co-operating with the brake pad.

According to the disclosure, the brake disc is axially movable and/or displaceable along the wheel axle for braking the wheel, in particular for co-operating with the brake pad.

In a preferred embodiment of the disclosure, the brake device comprises a hydraulic device for generating kinematic energy as a braking force. Preferably, the hydraulic device comprises a hydraulic chamber into which a fluid can be introduced and a reciprocating piston which can execute at least one stroke in the hydraulic chamber. For example, the hydraulic chamber is formed to be annular in a side plan view. In particular, the reciprocating piston is designed as an annular piston.

It is particularly preferred within the scope of the disclosure that the hydraulic device is attached to the wheel axle. In particular, the hydraulic device is arranged concentrically with the wheel rim on the wheel axle. In particular, the hydraulic device is arranged on one side of the wheel rim. Advantageously, the release forces generated during braking of the rotating wheel can thus be diverted to the wheel axle.

For fastening to the wheel axle, the brake device may comprise a fastening structure for the hydraulic device. Preferably, the fastening structure is attached to the wheel axle in a force-fitting manner, e.g., via an interference fit. Alternatively, the fastening structure can also be connected to the wheel axle in a form-fitting or materially bonded manner. Preferably, the hydraulic chamber and optionally, in addition, a flow channel of the hydraulic device through which the fluid can be introduced into the hydraulic chamber is arranged on and/or integrated into the fastening structure.

In one possible constructive implementation of the disclosure, the brake disc is arranged between the reciprocating piston and the brake pad. The brake disk is preferably in operative connection with the reciprocating piston. In particular, the brake disc is axially displaceable by the stroke of the annular piston and can thus be placed against and/or pressed against the brake pad. Here, kinetic energy of the reciprocating piston is converted into braking force for braking the rotating wheel. When the brake disc is applied and/or pressed against the brake pad, it can brake the rotating wheel by the friction generated. In particular, the brake device is designed as a friction brake.

Preferably, the brake disc can be moved axially back to its initial position and/or shifted back. In particular, the brake device comprises at least one, preferably several spring devices for this purpose. For example, the spring devices are designed as helical springs, in particular as return springs, and used for generating a restoring force. In particular, the brake disc can be subjected to the restoring force and thus moved back to its initial position.

In another possible embodiment of the disclosure, the wheel module comprises a housing for the brake device. The housing is formed, for example, from a plastic material or from an aluminum alloy. In a plan view from the side, it is ring-shaped and has a central recess for the wheel axle.

It is preferred within the scope of the disclosure that the housing at least partially accommodates the brake device. Preferably, the housing is connected to the fastening structure for the hydraulic device and/or the housing accommodates the same at least in sections therein. Optionally, the housing may form an integral part of the fastening structure.

In a further preferred embodiment of the disclosure, the housing covers most or all of the brake device and/or the wheel rim to the outside. In particular, the housing forms a visible side which, due to its material, can be designed to be visually appealing in a cost-effective manner, for example by means of a forming process and/or injection-molding process. In a top view from one side of the wheel of the wheel module, preferably only the visible side, a radial section of the wheel rim and/or the tire sitting on it are visible. This allows the brake device to be integrated into the wheel module in an inconspicuous and visually appealing manner.

In one possible embodiment of the disclosure, the brake pad is arranged on the wheel rim. In particular, the brake pad covers an outer surface of the wheel rim at least in sections. It is also possible within the scope of the disclosure that the brake pad is arranged in several sections on the wheel rim. Preferably, the brake pad rotates with and/or on the wheel rim.

Advantageously, the arrangement of the brake pad on the wheel rim ensures a space-saving design of the brake device. The number of components can be reduced and a slimmer design of the brake device can be achieved. In particular, the brake device does not build up outwardly, as is the case, for example, with ordinary brake shoes of a disc brake. It is further advantageous that the brake device can be adapted to a size of the wheel, in particular to a size of the wheel rim.

In a preferred embodiment of the disclosure, the brake pad is annular in shape. Preferably, the brake pad is arranged radially to the wheel axle. Alternatively or optionally in addition, the brake pad is arranged on the wheel rim so as to be concentric therewith. It is also possible within the scope of the disclosure for the brake pad to be arranged in several concentric circles on the wheel rim. As an alternative to the annular configuration, the brake pad can also be applied to the wheel rim in a flat manner, in particular as one or more surface sections, the surface section or sections preferably having suitable shapes and/or contours for co-operating with the brake disc.

In one possible constructive implementation of the disclosure, the brake pad is applied directly to the wheel rim. Preferably, the brake pad is connected to the wheel rim with a material bond. For example, it is glued to the wheel rim or integrated into the wheel rim.

Alternatively, it is possible within the scope of the disclosure that the wheel module includes a brake pad carrier that carries the brake pad. In particular, the brake pad carrier is arranged on the wheel rim, for example fastened to the wheel rim by fastening means such as screws, rivets or the like. For example, the brake pad carrier is formed as a ring, in particular as a sheet metal ring. Preferably, the brake pad carrier is arranged radially to the wheel axle. Alternatively or optionally in addition, the brake pad carrier is arranged on the wheel rim so that it is concentric therewith.

The brake pad preferably has the function of a thermal insulation device. In particular, the brake pad protects the wheel from exposure to waste heat from the brake device. Preferably, the brake pad is formed from a thermally insulating material for this purpose. Advantageously, heat generated during braking of the rotating wheel can be at least partially kept away from the wheel rim and/or from the drive device integrated in the wheel. In particular, this can prevent damage to the wheel due to overheating and/or a functional failure of the drive unit caused by the heat.

A possible further development of the disclosure provides that the wheel rim and/or the brake pad carrier comprises at least one rotation lock for the fastening means by which the brake pad carrier is fastened to the wheel rim. The at least one rotation lock can be formed, for example, as an axially extending recess in the wheel rim or in the brake pad carrier.

A further object of the disclosure is a vehicle having at least one wheel module according to the previous description and/or according to any one of claims 1 to 9. Preferably, the vehicle is designed as a two-Wheeled vehicle, e.g., an electric pedal scooter, an electric scooter, or an electric bicycle.

In a preferred embodiment, the vehicle comprises a vehicle frame with a wheel fork. Preferably, the wheel fork carries the wheel module. In particular, the wheel axle is arranged on the wheel fork together with the wheel rotatably mounted thereon for this purpose. For example, the wheel fork is connected to a handlebar of the vehicle so that the wheel module and thus the vehicle can be steered.

A further object of the disclosure is a method for braking a rotating wheel of a wheel module with a brake device of the wheel module according to the previous description and/or according to any of claims 1 to 8. In the process, the brake disc is axially displaced to brake the rotating wheel and is applied and/or pressed against the brake pad, which is preferably arranged on the wheel rim.

BRIEF DESCRIPTION OF THE DRAWINGS

Further features, advantages and effects of the disclosure are set out in the following description of the preferred embodiments of the disclosure. In the figures.

DETAILED DESCRIPTION

Parts that correspond to each other or are identical are marked with the same reference numbers in the illustrations.

Figure 1:
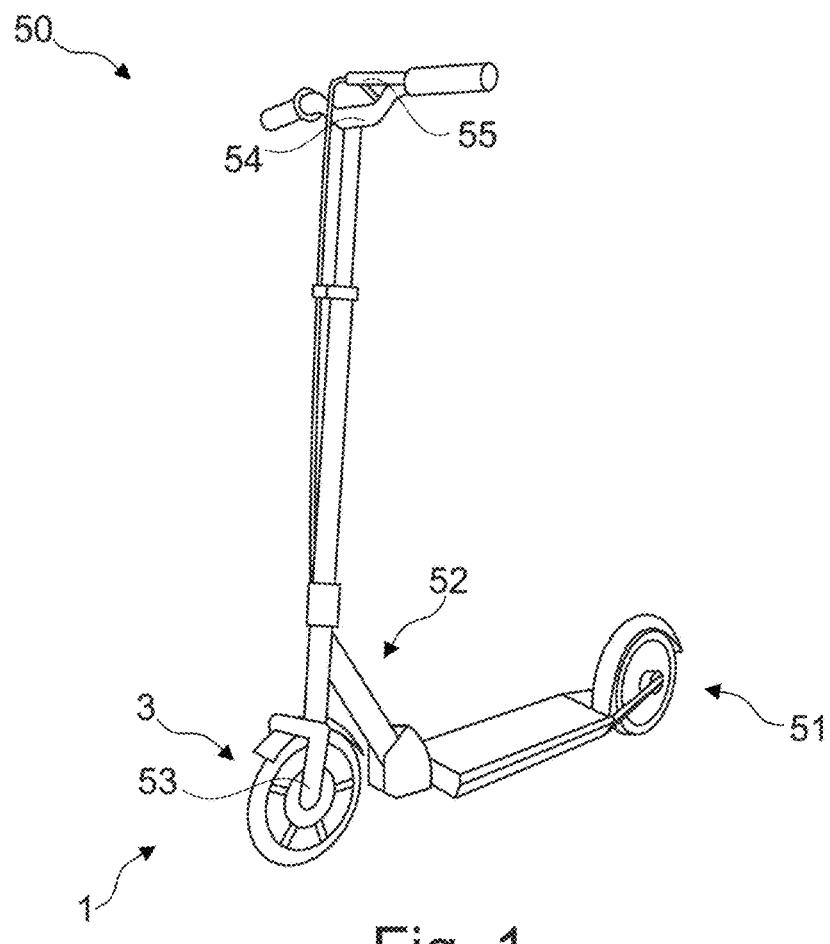
FIG. 1 shows a vehicle with a wheel module, wherein the vehicle is configured as an electric scooter or an electric motorcycle.

FIG. 1 shows a vehicle 50 with a wheel module 1. The vehicle 50 is configured as an electric motorcycle or electric scooter. The wheel module 1 has a wheel 3, wherein the wheel 3 in the vehicle 50 is a front wheel. The vehicle 50 also has a rear wheel 51. The wheel module and the rear wheel are arranged on a vehicle frame 52 of the vehicle 50. The wheel module 1 is rotatably attached to the vehicle frame 52, in particular to a handlebar 54 of the vehicle 50, via a wheel fork 53, so that the vehicle 50 can be steered via the wheel module 1.

Figure 2:
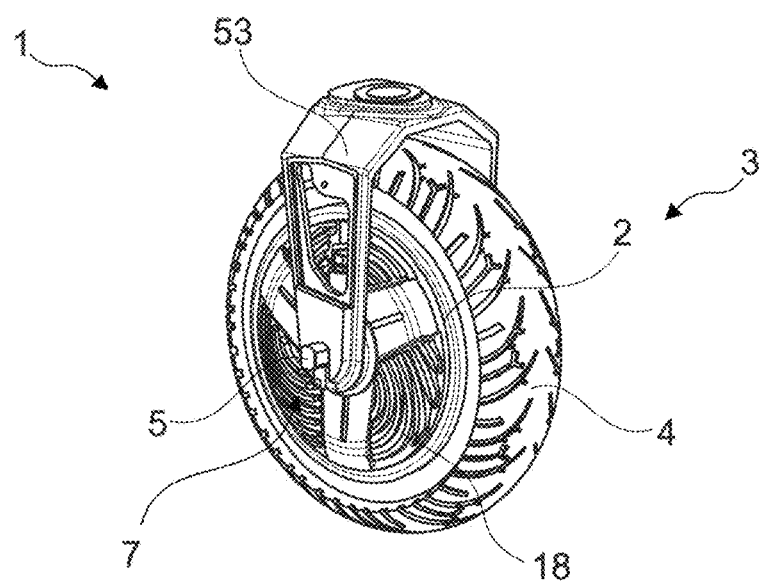
FIG. 2 shows the wheel module of FIG. 1 with a brake device for braking a rotating wheel of the wheel module.

According to FIG. 2, in which the wheel module 1 is shown in a perspective side plan view, the wheel 3 of the wheel module 1 has a wheel rim 2 and a tire 4, the tire 4 being arranged on the wheel rim 2. The wheel module 1 comprises a wheel axle 5 on which the wheel rim 2 is rotatably mounted. As can be seen from FIGS. 4 and 5, two rolling bearing devices 6 are provided for supporting the wheel rim 2 on the wheel axle 5. A drive device 17 (FIGS. 4, 5), e.g., an electric motor, is integrated in the wheel rim 2 for driving the wheel 3.

The wheel module 1 has a brake device 7 for the rotating wheel 3. The brake device 7 is designed as a friction brake. It is located adjacent to the wheel rim 2 and/or on one side of the wheel rim 2 on the wheel axle 5.

Figure 4:
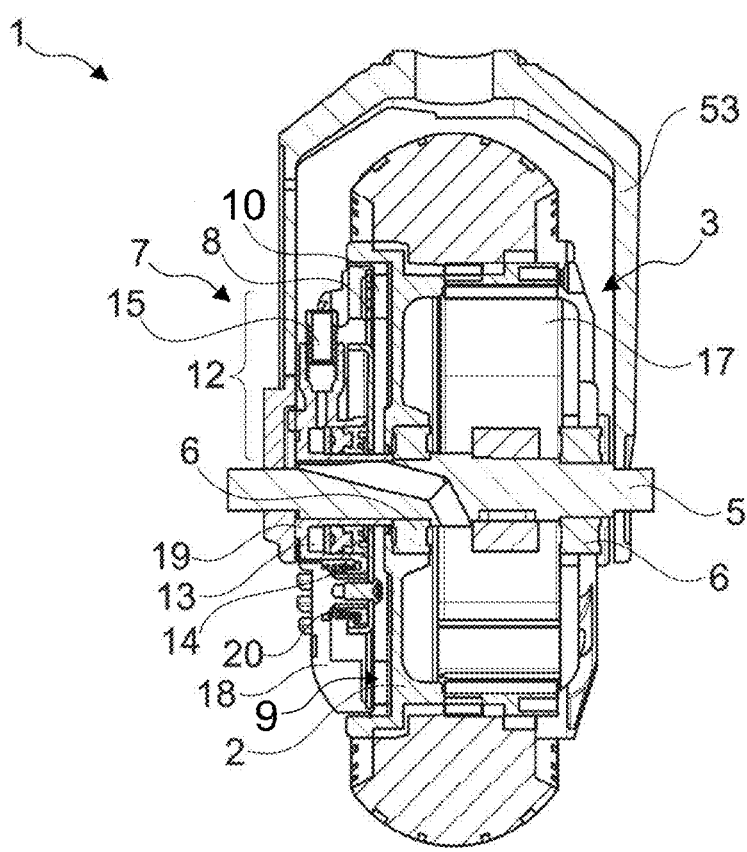
FIG. 4 shows an axial sectional view of the wheel module shown in FIG. 2.

As can be seen from FIG. 4, which shows an axial cross-section of the wheel module of FIG. 2, the brake device 7 has a brake disc 8 for braking the rotating wheel 3. The brake disc 8 is arranged concentrically with the wheel rim 2 on the wheel axle 5. It is axially movable, in particular displaceable towards the wheel rim 2.

Figure 3:
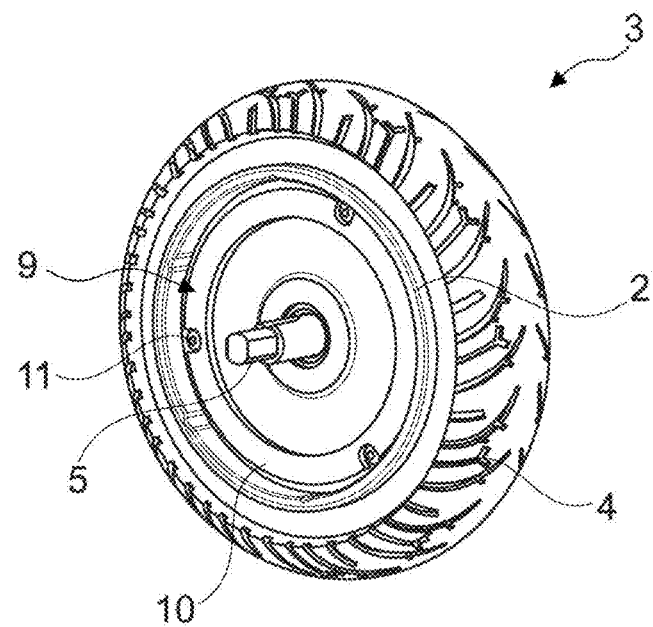
FIG. 3 shows the wheel module without the brake device.

FIG. 3 shows a perspective view of the wheel 3 from the side. As can be seen therefrom, the brake device 7 comprises a brake pad 9 for co-operating with the brake disc 8 (FIG. 4) to brake the rotating wheel 3 by friction between the brake disc 8 and the brake pad 9.

The brake pad 9 is annular in shape and is applied to the wheel rim 2. The brake pad 9 thus covers and/or forms a region of an outer surface of the wheel rim 2. The brake pad 9 is arranged on the wheel rim 2 so that it is concentric with the wheel rim 2. In a possible embodiment, not shown, the brake pad 9 can be applied directly to the wheel rim 2, in particular connected to it in a materially bonded manner, for example glued onto it.

Figure 5:
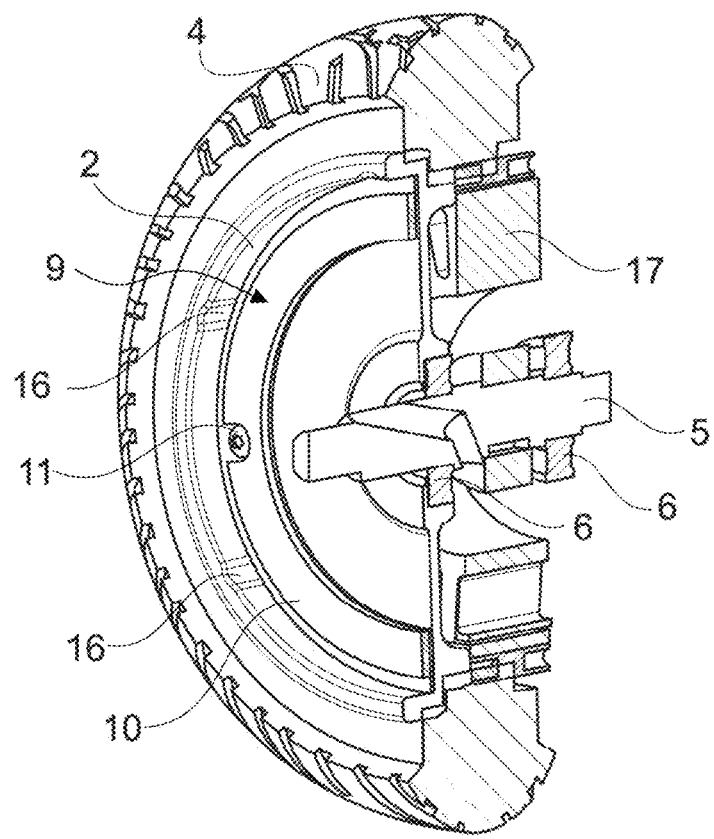
FIG. 5 shows an axial sectional view of the wheel module without the brake device according to FIG. 3.

In an alternative embodiment according to FIGS. 3 to 5, the wheel module 1 comprises a brake pad carrier 10 for carrying the brake pad 9. The brake pad carrier 10 is annular in shape, e.g., in the form of a sheet metal ring, and is fastened to the wheel rim 2 by fastening means 11, in particular by a number of screws. The brake pad carrier 10 is arranged on the wheel rim 2 in such a way that it is radial to the wheel axle 5 and concentric with the wheel rim 2. The brake pad 9 is applied to the brake pad carrier 10.

Figure 6:
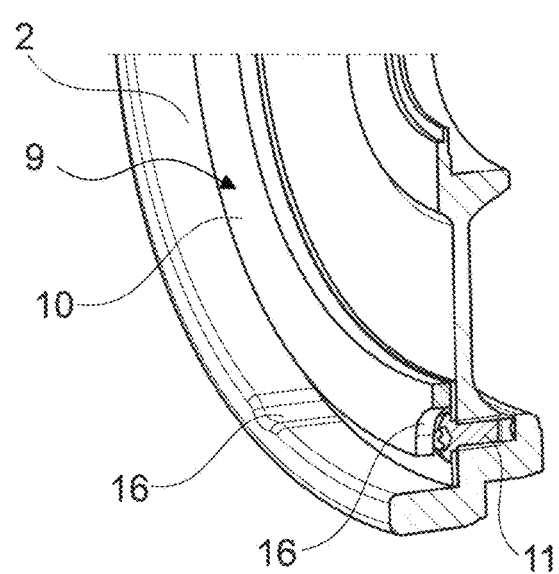
FIG. 6 shows a section of a wheel rim of the wheel.

FIG. 5 shows an axial cross-section of the wheel 3 and FIG. 6 shows a section of the wheel rim 2 in an axial cross-section. Rotation locks 16 (FIGS. 5, 6) in the form of axially extending recesses for the fastening means 11 are arranged in the wheel rim 2 and in the brake pad carrier 10. The rotation locks 16 can prevent the fastening means 11 from loosening unintentionally due to the rotation of the wheel 3, thereby preventing the brake pad carrier 10 from falling off the wheel rim 2.

Because the brake pad 9 and/or the brake pad carrier 10 is/are arranged on the wheel rim 2, the brake device 7 can advantageously be designed to be particularly space-saving and particularly slim and narrow. The brake device 7 can be adapted to a size of the wheel, in particular to a size of the wheel rim, due to the concentric arrangement of the hydraulic device 12, the brake disc 8 and the wheel rim 2.

According to FIG. 4, the brake device 7 comprises a hydraulic device 12 for generating the braking force by kinematic energy. The hydraulic device 12 is attached to the wheel axle 5. It has a hydraulic chamber 13 that is annular in shape in a side plan view and an annular piston 14 that can perform a stroke in the hydraulic chamber 13. The hydraulic device 12 also comprises a flow channel 15 through which a fluid can be introduced into the hydraulic chamber 13 to cause the annular piston 14 to execute the stroke.

The hydraulic chamber 13 and the annular piston 14 are arranged concentrically with the wheel rim 2. To fasten the hydraulic device 12 to the wheel axle 5, the brake device 7 has a fastening structure 19. The fastening structure 19 is fastened to the wheel axle 5 in a force-fitting manner, in particular by an interference fit. The hydraulic chamber 13 and the flow channel 15 are attached to the fastening structure 19. However, they may also form an integral part of the fastening structure 19. Advantageously, the release forces generated when braking the rotating wheel 3 can be diverted to the wheel axle 5 by fastening the hydraulic device 13 to the wheel axle.

To activate the hydraulic device 12, the vehicle 50 has an actuating device 55, for example a hand lever (see FIG. 1). When the actuating device 55 is actuated, the fluid is directed into the hydraulic chamber 13 so that the annular piston 14 performs the stroke in the hydraulic chamber 13. When the actuating device 55 is no longer actuated, the fluid flows back and the annular piston 14 performs a return stroke in the hydraulic chamber 13. The brake disc 8 is released from the brake pad 9 and can be moved axially back to its initial position. In particular, this stops the braking process.

The brake disc 8 is in an operative connection with the annular piston 14. It is arranged between the brake pad 9 and the annular piston 14. When the annular piston 14 executes the stroke, it transfers the kinematic energy as braking force to the brake disc 8. This causes the brake disc 8 to be displaced axially in the direction of the wheel rim 2, to be applied to and/or pressed against the brake pad 9. The friction generated between the brake disc 8 and the brake pad 9 brakes the rotating wheel. Advantageously, the brake pad 9 forms an insulation device during braking, protecting the drive device 17 from incident heat generated by brake friction.

The brake device 7 has several spring devices 20 distributed in the circumferential direction. The spring devices 20 are designed as return springs to apply a restoring force to the brake disc 8 and thus to the annular piston 14, whereby the brake disc 8 is moved axially back to its initial position by the restoring force. The spring devices 20 are each supported on the housing 18 and in the opposite axial direction on the brake disc 8.

As can be seen from FIGS. 2 and 4, the wheel module 1 has a housing 18. The housing 18 is formed from a plastic material or, alternatively, from an aluminum alloy. In a side plan view, for example according to FIG. 2, it is designed to be annular in shape and has a central recess for the wheel axle 5. The brake device 7, in particular the hydraulic device 12, is accommodated in the housing 18. For this purpose, the fastening structure 19 is connected to the housing 18. The connection can be implemented in a form-fitting and/or force-fitting manner, but also as a materially bonded connection. The brake disc 8 is also at least partially accommodated in the housing 18 as shown in FIG. 4.

An outside of the housing 18 is a visible side which covers the brake device 7 and a large part of the wheel rim 2 to the outside. The brake device 7 is thereby inconspicuously integrated in the wheel module 1. The visible side can be designed to be visually appealing, e.g., according to FIG. 2, a structure can be introduced on the outer side.

LIST OF REFERENCE NUMBERS

1 Wheel module
2 Wheel rim
3 Wheel
4 Tire
5 Wheel axle
6 Rolling bearing devices 7 Brake device
8 Brake disc
9 Brake pad
10 Brake pad carrier
11 Fastening means
12 Hydraulic device
13 Hydraulic chamber
14 Annular piston
15 Flow channel
16 Rotation lock
17 Drive device
18 Housing
19 Fastening structure
20 Spring device
50 Vehicle
51 Rear wheel
52 Vehicle frame
53 Wheel fork
54 Handlebar
55 Actuating device

The invention claimed is:

1. A wheel module for a vehicle, comprising:
a wheel axle and a wheel, the wheel comprising a wheel rim and said wheel rim being rotatably mounted on the wheel axle,
and a brake device for the wheel, the brake device comprising a brake pad and a brake disc for cooperating with the brake pad,
wherein
the brake disc is axially movable in order to brake the wheel, and
the brake pad is arranged directly or indirectly on the wheel rim.

2. The wheel module according to claim 1, wherein the brake device comprises a hydraulic device with an annular hydraulic chamber in a side plan view and with an annular piston for performing a stroke and a return stroke in the hydraulic chamber.

3. The wheel module according to claim 2, wherein the brake disc is arranged between the annular piston and the brake pad and is axially displaceable by the stroke of the annular piston and can be placed against or pressed against the brake pad.

4. The wheel module according to claim 2, wherein the hydraulic device is attached to the wheel axle and is arranged concentrically with the wheel rim.

5. The wheel module according to claim 1, wherein the brake device comprises at least one spring device for generating a restoring force and for applying the restoring force to the brake disc so that the brake disc can be moved axially back into its initial position.

6. The wheel module according to claim 1, wherein the wheel module has a brake pad carrier for carrying the brake pad.

7. The wheel module according to claim 1, wherein the brake pad forms a thermal insulation device, wherein the thermal insulation device protects the wheel from waste heat of the brake device.

8. A vehicle having at least one wheel module according to claim 1.

9. A method for braking a rotating wheel of a wheel module having a brake device of the wheel module according to claim 1, wherein the brake disc is axially displaced and is applied or pressed against the brake pad.

10. A wheel module for a vehicle, comprising:
a wheel axle;
a wheel having a wheel rim rotatably mounted on the wheel axle; and
a brake device configured for braking the wheel, the brake device comprising a brake pad, a brake pad carrier arranged for carrying the brake pad and a brake disc axially movable in order to brake the wheel, wherein the brake pad carrier is fastened to the wheel rim.

11. The wheel module according to claim 10, wherein the wheel rim is rotatably mounted on the wheel axle via two rolling bearing devices.

12. A wheel module for a vehicle, comprising:
a wheel axle;
a wheel having a wheel rim rotatably mounted on the wheel axle;
a brake device configured for braking the wheel, the brake device comprising a brake pad, a brake pad carrier arranged for carrying the brake pad and a brake disc axially movable in order to brake the wheel; and
rotation locks designed as axially extending recesses formed in the wheel rim and the brake pad carrier, wherein the brake pad carrier is fastened to the wheel rim.

* * * * *